(12) United States Patent
Abzarian et al.

(10) Patent No.: US 8,838,807 B2
(45) Date of Patent: Sep. 16, 2014

(54) EDGE TRAVERSAL SERVICE DORMANCY

(75) Inventors: David Abzarian, Kirkland, WA (US);
Michael R. Surkan, Bellevue, WA (US);
Salahuddin C. J. Khan, Redmond, WA (US); Amit A. Sehgal, Kirkland, WA (US); Mohit Talwar, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 66 days.

(21) Appl. No.: 13/211,009

(22) Filed: Aug. 16, 2011

(65) Prior Publication Data

US 2011/0302314 A1 Dec. 8, 2011

Related U.S. Application Data

(63) Continuation of application No. 11/823,029, filed on Jun. 26, 2007, now Pat. No. 7,707,294, and a continuation of application No. 12/632,110, filed on Dec. 7, 2009, now Pat. No. 8,028,076.

(51) Int. Cl.
*G06F 15/16* (2006.01)
*H04L 29/06* (2006.01)

(52) U.S. Cl.
CPC ............ *H04L 63/029* (2013.01); *H04L 69/16* (2013.01)
USPC ............. 709/227; 709/203; 709/223; 726/11

(58) Field of Classification Search
USPC ................. 709/227, 203, 223, 200, 224, 220; 726/11
See application file for complete search history.

(56) References Cited

U.S. PATENT DOCUMENTS

| 7,072,350 | B2 | 7/2006 | Dooley et al. |
| 7,124,173 | B2 | 10/2006 | Moriarty |
| 7,139,837 | B1 * | 11/2006 | Parekh et al. ............... 709/238 |
| 7,466,652 | B2 | 12/2008 | Lau et al. |

(Continued)

FOREIGN PATENT DOCUMENTS

| EP | 1739897 A1 | 1/2007 |
| EP | 1744500 A1 | 1/2007 |

OTHER PUBLICATIONS

"Windows Vista", Microsoft Windows Vista Compatibility Document, Microsoft Windows Application Experience Group, Version 6.0, Jan. 4, 2007, 91 pgs.

(Continued)

*Primary Examiner* — El Hadji Sall
(74) *Attorney, Agent, or Firm* — John Jardine; Andrew Sanders; Micky Minhas

(57) ABSTRACT

A system maintains a dormant state in the host, in which no beacons (or "bubbles") are transmitted from the host when no application or service (collectively, "processes") of the host is accepting unsolicited traffic via the edge traversal service. When at least one application or service begins to accept unsolicited traffic via the edge traversal service, the host enters a qualified state and begins transmitting the beacons. As each additional application or service begins to accept such traffic, the number of accepting applications and services is maintained. As applications and services terminate acceptance of such traffic, the number of accepting applications and services is decremented. When the last application or service terminates acceptance of unsolicited traffic via the edge traversal service, the host re-enters the dormant state and ceases transmission of its beacons.

20 Claims, 8 Drawing Sheets

(56) References Cited

U.S. PATENT DOCUMENTS

| | | |
|---|---|---|
| 7,881,440 B2 | 2/2011 | Castillo et al. |
| 2003/0072318 A1 | 4/2003 | Lam et al. |
| 2003/0122830 A1 | 7/2003 | Yap |
| 2004/0187028 A1 | 9/2004 | Perkins et al. |
| 2005/0015752 A1 | 1/2005 | Alpern et al. |
| 2005/0076234 A1 | 4/2005 | Krtolica et al. |
| 2005/0125532 A1 | 6/2005 | Kimchi |
| 2005/0198499 A1 | 9/2005 | Salapaka et al. |
| 2005/0238034 A1* | 10/2005 | Gillespie et al. ............... 370/401 |
| 2006/0021001 A1 | 1/2006 | Giles et al. |
| 2006/0041935 A1 | 2/2006 | Conley et al. |
| 2006/0085548 A1 | 4/2006 | Maher, III et al. |
| 2006/0288103 A1 | 12/2006 | Gobara et al. |
| 2007/0171835 A1 | 7/2007 | Gobara et al. |
| 2007/0198662 A1* | 8/2007 | Parham et al. ................. 709/219 |
| 2007/0255861 A1 | 11/2007 | Kain et al. |
| 2008/0141366 A1 | 6/2008 | Cross et al. |
| 2008/0225839 A1 | 9/2008 | Gobara et al. |
| 2009/0064304 A1 | 3/2009 | Cohen et al. |

OTHER PUBLICATIONS

"Teredo: Tunneling IPv6 over UDP through Network Address Translations", C. Huitema, The Internet Society (2006), Feb. 2006, 50 pgs.

"Teredo Overview", Reprinted from the Internet at: http://technet.microsoft.com/en-us/library/bb457011.aspx, Published Jan. 1, 2003, 37 pgs.

Notice of Allowance in related U.S. Appl. No. 11/823,029 dated Jun. 25, 2009.

Notice of Allowance in related U.S. Appl. No. 12/632,110 dated Oct. 21, 2010.

Notice of Allowance in related U.S. Appl. No. 12/632,110 dated May 16, 2011.

* cited by examiner

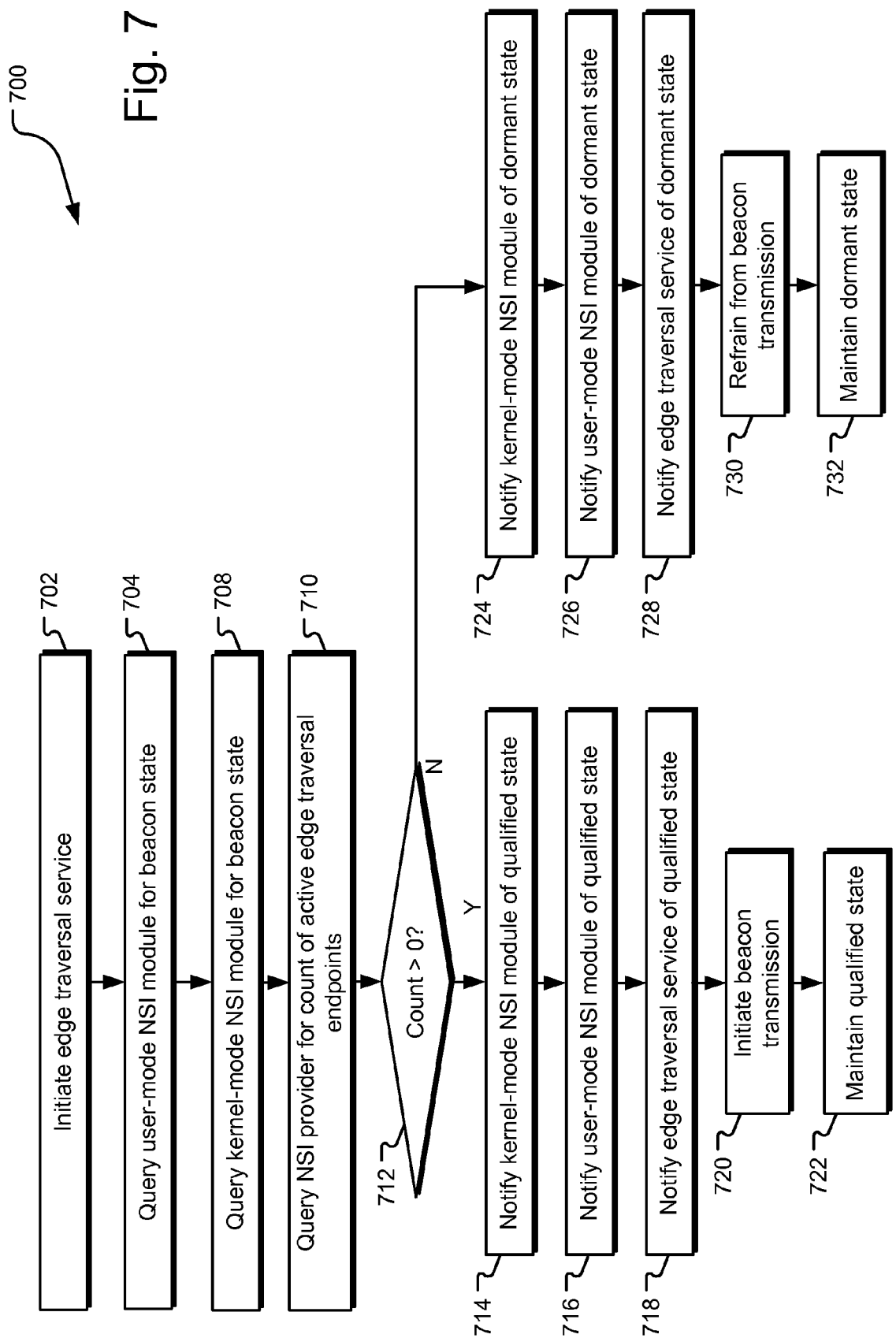

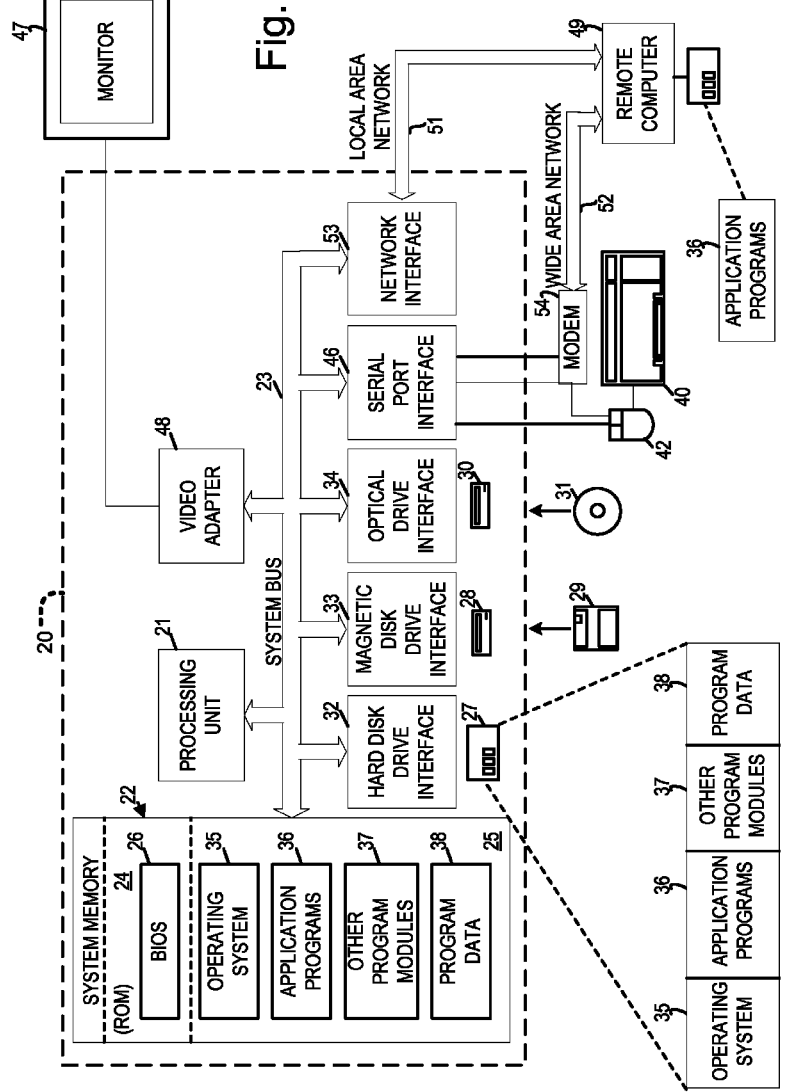

EDGE TRAVERSAL SERVICE DORMANCY

RELATED APPLICATIONS

This application is a continuation of U.S. application Ser. No. 11/823,029, filed on Jun. 26, 2007, entitled "EDGE TRAVERSAL SERVICE DORMANCY," and U.S. application Ser. No. 12/632,110, filed on Dec. 7, 2009, entitled "EDGE TRAVERSAL SERVICE DORMANCY", at least some of which may be incorporated herein.

BACKGROUND

Many computer hosts are connected within a local network to certain entry points to that local network, such as a network address translation (NAT) device or a firewall application or device positioned at an "edge" of the local network. Certain edge traversal technologies have emerged to allow legitimate unsolicited inbound traffic to traverse such edge entities. One particular implementation of such technology is an edge traversal service designed to send UDP (uniform data packet) "bubbles" from the host to artificially maintain address mapping states on edge devices in order to allow the unsolicited UDP traffic to traverse back through said edge devices. Without the bubbles, the address mapping state on the edge device may time out or close, thereby disabling the edge traversal feature until the mapping state is reinitialized or re-opened at some later point in time. Note that the host is generally unable to receive unsolicited external traffic when the edge traversal feature is disabled. In summary, an edge traversal service allows a host to receive unsolicited, inbound traffic through its local network edge.

In one implementation, UDP bubbles are transmitted from a host in the local network to maintain an open state on one or more edge devices. However, the UDP bubbles sent from such hosts inside the local network act as beacons that notify both legitimate and illegitimate entities outside the local network of the host's existence, and importantly, of the host's ability to received unsolicited traffic, even when no application or service in the host is actively accepting unsolicited traffic. As such, the UDP bubbles can expose the host, and therefore the local network, to undesirable security risks, even when the host is not actively accepting unsolicited traffic. Furthermore, the bubbles can also create unnecessary traffic on a network and present privacy concerns.

SUMMARY

Implementations described and claimed herein address the foregoing problems by maintaining a dormant state in the host, in which no beacons (or "bubbles") are transmitted from the host when no application or service (collectively, "processes") of the host is accepting unsolicited traffic via the edge traversal service. When at least one application or service begins to accept unsolicited traffic via the edge traversal service, the host enters a qualified state and begins transmitting the beacons. As each additional application or service begins to accept such traffic, the number of accepting applications and services (representing active edge traversal endpoints) is maintained. As applications and services terminate acceptance of such traffic, the number of accepting applications and services is decremented. When the last application or service terminates acceptance of unsolicited traffic via the edge traversal service, the host re-enters the dormant state and ceases transmission of its beacons.

In some implementations, articles of manufacture are provided as computer program products. One implementation of a computer program product provides a computer program storage medium readable by a computer system and encoding a computer program. Another implementation of a computer program product may be provided in a computer data signal embodied in a carrier wave by a computing system and encoding the computer program. Other implementations are also described and recited herein.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTIONS OF THE DRAWINGS

FIG. 7 illustrates example operations for updating active edge traversal endpoints.

FIG. 8 illustrates an example system that may be useful in implementing the described technology.

DETAILED DESCRIPTIONS

Figure 1:
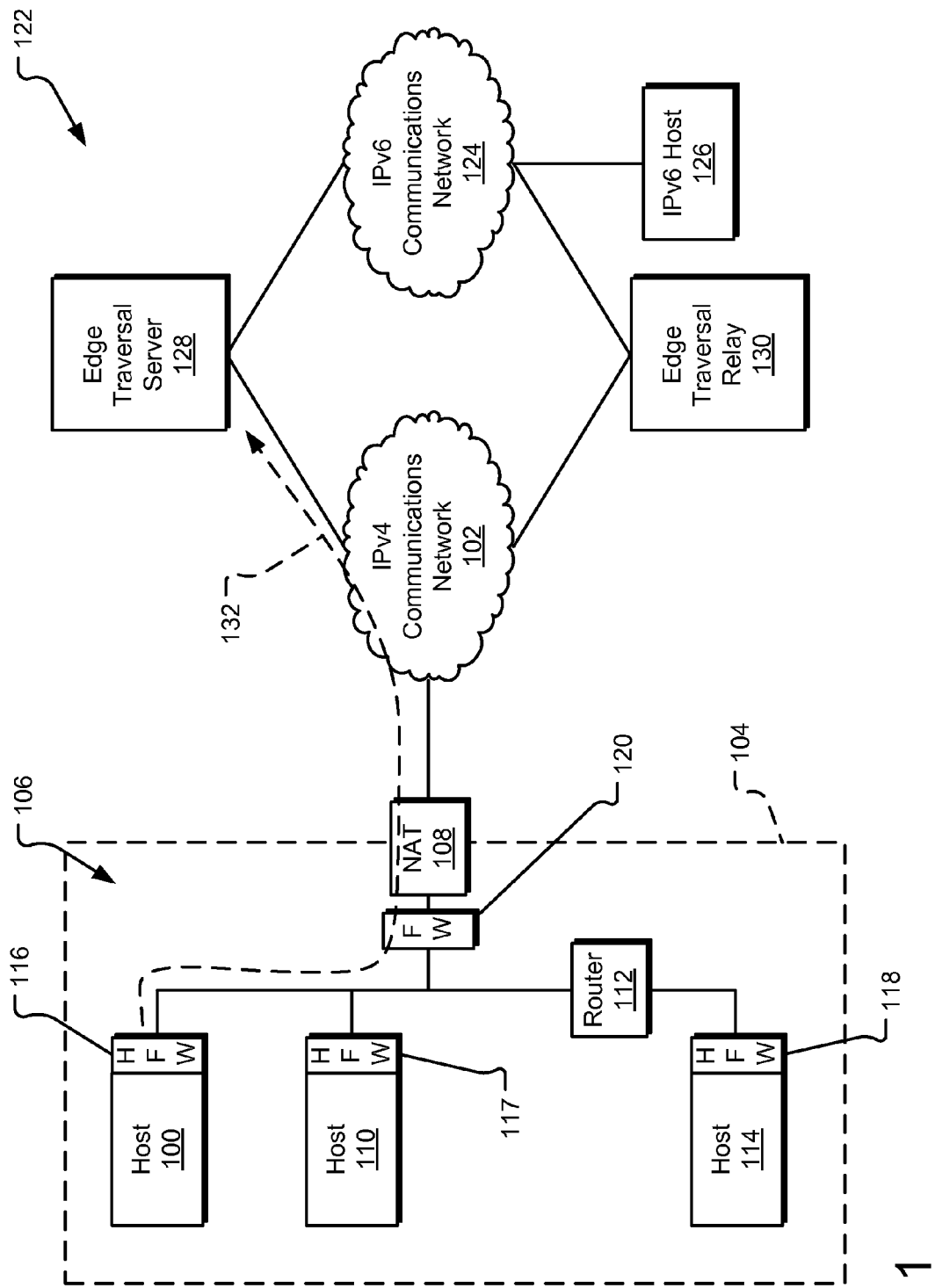
FIG. 1 illustrates an example host computer connected to a communications network beyond the edge of its local network.

FIG. 1 illustrates an example host computer 100 connected to an IPv4 communications network 102 beyond the edge 104 of its IPv4 local network 106. A NAT device 108 represents an edge device that provides an entry point for traffic into the local network 106. Other examples of edge devices may include without limitation routers, firewalls, intrusion protection systems, intrusion detection systems, VPN gateways, edge switches, edge translators, etc. The local network 106 also includes other computing and communications entities, including without limitation another host computer 110, a router 112, and another host computer 114.

The host 100 includes a host firewall (HFW) 116 that is configured control traffic between the host 100 and other entities, such as computer 112. The hosts 110 and 114 are also shown with host firewalls 117 and 118, respectively. The host firewall 116 filters (e.g., allows or blocks) certain traffic transmitted to or from the host 100 according to specified firewall rules. In one implementation, a default firewall rule may block all inbound traffic. Given this default, one or more firewall rules can be specified as exceptions to the default in order to allow certain traffic to pass through the host firewall. For example, a firewall rule may allow all inbound traffic received by the host 100 and destined to a service Foo executing on the host 100 via TCP port 321. Other exceptions may also be specified. The local network 106 also includes an enterprise firewall (FW) 120, which is tasked with controlling traffic between the local network 106 and the IPv4 communications network 102.

The local network 106 and the IPv4 communications network 102 are connected within an aggregate network 122, which also includes an IPv6 communications network 124 and an IPv6 host 126 and may include many other host computers, communication entities, security entities, etc. An edge traversal technology has been implemented within the aggregate network 122 to allow unsolicited inbound traffic to traverse the edge devices of the local network 106, such as the NAT 108 and the enterprise firewall 120. In one implementation, the host 100 represents an edge traversal client that supports an edge traversal tunneling protocol through which packets are tunneled from other hosts outside the local network 106. In this manner, the host 100 supports IPv6 addressing from behind the NAT 108 in order to access the IPv6 communications network 124 and the IPv6 host 126.

The host 100 communicates with an edge traversal server 128 to obtain an address prefix from which a valid IPv6 address is configured or to help initiate communication with other clients or hosts on the IPv6 communications network 124. The edge traversal server 128 is an IPv6/IPv4 node that is connected to both the IPv4 communications network 102 and the IPv6 communications network 124 and supports an edge traversal tunneling interface over which packets are received. In one implementation, the edge traversal server 128 assigns the host 100 an IPv6 address that incorporates its IPv4 address and the port through which it is communicating. An edge traversal relay 130 serves as a remote end of an edge traversal tunnel, forwarding data received on behalf of the edge traversal clients it serves.

To allow unsolicited traffic to traverse an edge device, such as the NAT device 108, the host sends periodic traffic 132 (i.e. edge traversal service beacons) through the edge device to the edge traversal server 128. The beacons 132 cause the NAT device 108 to maintain the address mapping state, for example, preventing it from timing out and closing. In this manner, the beacons 132 keep a channel open through which the unsolicited emails can traverse the edge 104 to the host computer 100.

However, when no process associated with the edge traversal service is accepting unsolicited edge traversal traffic, the edge traversal service is maintained in a dormant beacon transmission state, so that no beacons 132 are transmitted through the edge device. When a process associated with the edge traversal service begins to accept unsolicited edge traversal traffic, such as through a bind or listen operation, the edge traversal service transitions to a qualified beacon transmission state, subject to other networking conditions such as host firewall rules, and initiates the transmission of the beacons 132. When the number of processes associated with the edge traversal service that are accepting unsolicited edge traversal traffic drops to zero, the edge traversal service transitions back to the dormant beacon transmission state and ceases the transmission of the beacons 132.

Through these or similar mechanisms, the aggregate network 122, and particularly the host 100, can support edge traversal technology. If the edge security devices on the local network (e.g., the edge firewall 120) allow unsolicited traffic to an edge traversal service of hosts in the local network 106, then the host firewall 116 will be able to make the determination about whether to pass the traffic to a target application or service within the host 100. In order for the host 100 to securely control such edge traversal traffic, the traffic is evaluated against one or more firewall rules of the host firewall 116. In one implementation, the host firewall 116 and an edge traversal service within the host 100 determine whether the traffic has traversed an edge of the local network, generate an edge traversal context for the traffic and evaluates the traffic, including the edge traversal context, against the applicable firewall rules to determine whether to allow traffic to be received by target in the host 100. The firewall rule includes an edge traversal criterion that influences whether the traffic is blocked or allowed.

Figure 2:
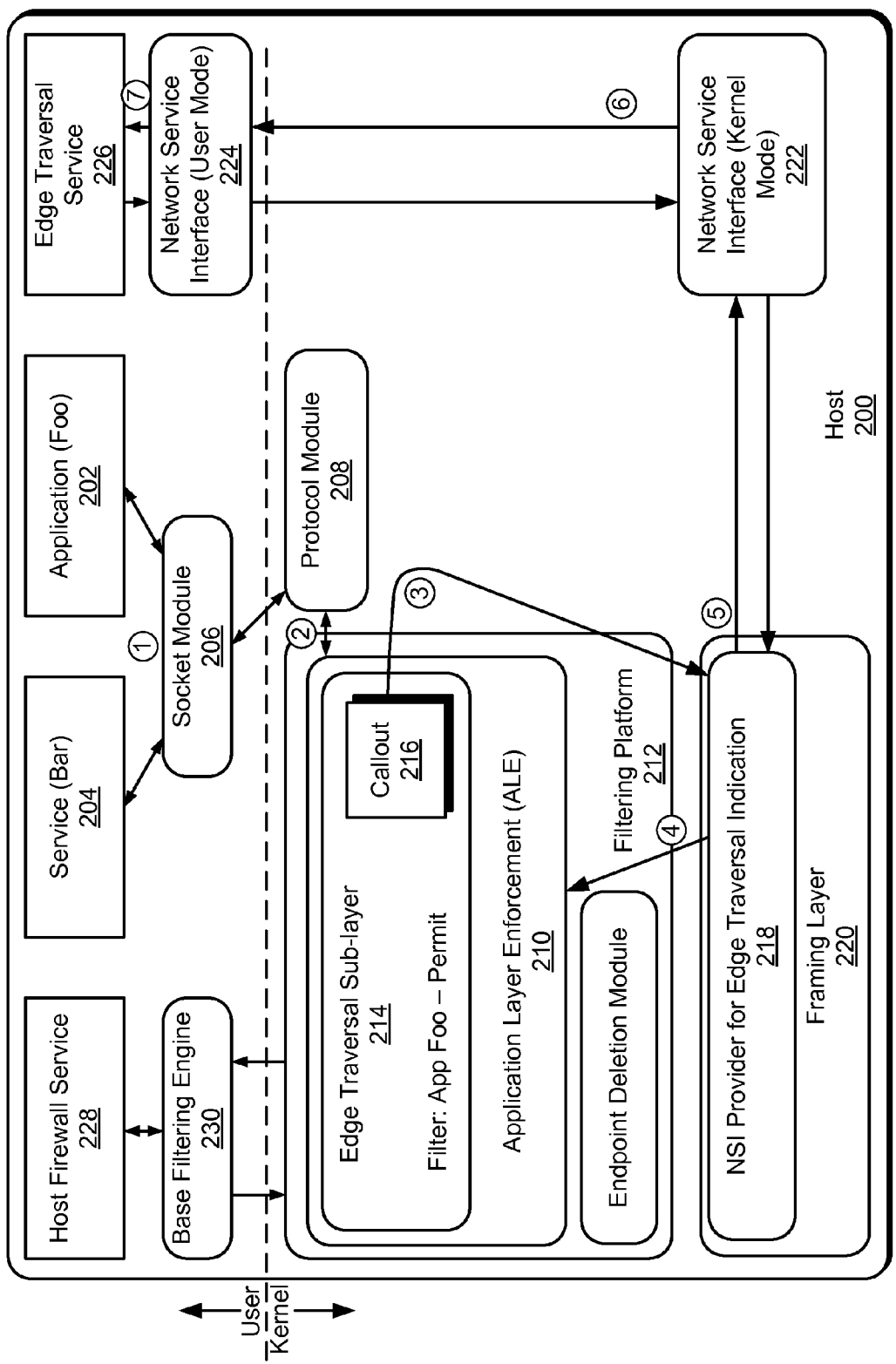
FIG. 2 illustrates an example host adding an active edge traversal endpoint.

FIG. 2 illustrates an example host 200 adding an active edge traversal endpoint, which represents a host process that is accepting unsolicited edge traversal traffic. The host 200 is capable of executing processes (e.g., application Foo 202 and service Bar 204) capable of accepting such traffic. To accept such traffic, a process configures the host 200 to enable network communications to the process. In one implementation, the process opens a socket to support the network communications and binds/listens to a port via a temporary edge traversal adapter address. For example, a service Foo 202 calls to a socket module 206 to open a socket. The socket module 206 communicates with a protocol module 208 (such as a TCP/IP stack module) to open the socket. The protocol module 208 calls to an application layer enforcement (ALE) module 210 in a filtering platform 212. The protocol module 208 and the ALE module 210 establish corresponding states representing the open socket. A reference to the socket is then communicated back to the process.

Having created and obtained an open socket, the process then attempts to establish a local association with the socket by assigning a local name to the socket (e.g., in step 1, identified by the circle labeled "1" in FIG. 2). In one implementation, the process creates the association for TCP via a bind command, although other commands may establish this association, such as a listen command. The association operation works through the socket module 206, the protocol module 208, and the filtering platform to perform a resource assignment using a filter in an edge traversal sub-layer 214 (e.g., in step 2, identified by the circle labeled "2" in FIG. 2) of the ALE module 210. By virtue of its filters, the ALE module 210 determines whether to permit edge traversal traffic to the process (e.g., application Foo 202) and executes a callout function 216 (e.g., in step 3, identified by the circle labeled "3" in FIG. 2), if the association operation (e.g., bind) satisfies the filter and is otherwise permitted by the ALE module 210. The callout causes a count of active edge traversal endpoints to be incremented in a Network Service Interface (NSI) Provider structure 218 in a framing layer module 220, which monitors for a transition from zero to one (0→1) in this count and for a transition from one to zero (1→0) in this count. The framing layer module 220 registers (e.g., in step 4, identified by the circle labeled "4" in FIG. 2) a notification with the ALE module 210, responsive to the addition of the active edge traversal endpoint. This registration identifies the newly added active edge traversal endpoint to the ALE module 210 so that the ALE module 210 can decrement the active edge traversal endpoint count when the endpoint is deleted at a later time.

In the case of adding active edge traversal endpoints, as described with regard to FIG. 2, when the framing layer module 220 detects a 0→1, the framing layer module 220 notifies the kernel-mode NSI module 222 of the transition (e.g., in step 5, identified by the circle labeled "5" in FIG. 2). The kernel-mode NSI module 222 then communicates a representation of the notification to the user-mode NSI module 224 (e.g., in step 6, identified by the circle labeled "6" in FIG. 2). The user-mode NSI module 224 then communicates (e.g., step 7, identified by the circle labeled "7" in FIG. 2) a representation of the notification to the edge traversal service 226. The edge traversal service 226, which generally initializes to a "dormant" beacon transmission state in which no beacons are transmitted, interprets the communication as an instruction to transition from the "dormant" beacon transmission state to a "qualified" beacon transmission state in which beacons are transmitted through an edge device of the local network.

As will be described below, in one implementation, the edge traversal sub-layer 214 resides in a prioritized listing of filter sub-layers (e.g., wherein the edge traversal sub-layer 214 has a lower priority or weighting than a host firewall sub-layer or network service hardening sub-layer). In this manner, if a higher priority filter sub-layer blocks the association operation (e.g., because of a rule preventing socket operations by the process, such as socket creation), the block supersedes any permission that may be allocated by the edge traversal sub-layer 214, thereby preventing the incrementing of the active edge traversal endpoint count and blocking the transmission of any beacons based solely on the present association operation. It should be understood, however, that other applications and/or association operations may have already caused a 0→1 transition and initiated the transmission of beacons.

Also illustrated in FIG. 2 are a host firewall service 228 and a base filtering engine 230, which communicate with the filtering platform 212 to block or permit traffic destined for processes in the host 200. In the illustrated implementation, both the firewall features and the edge traversal features rely on a single filtering platform, although other implementations may be configured differently (e.g., different filtering platforms, non-filtering implementations, etc.). For examine, an NDIS (Network Driver Interface Specification) driver or TDI (Transport Data Interface) hook could be utilized to intercept and act upon edge traversal traffic.

Figure 3:
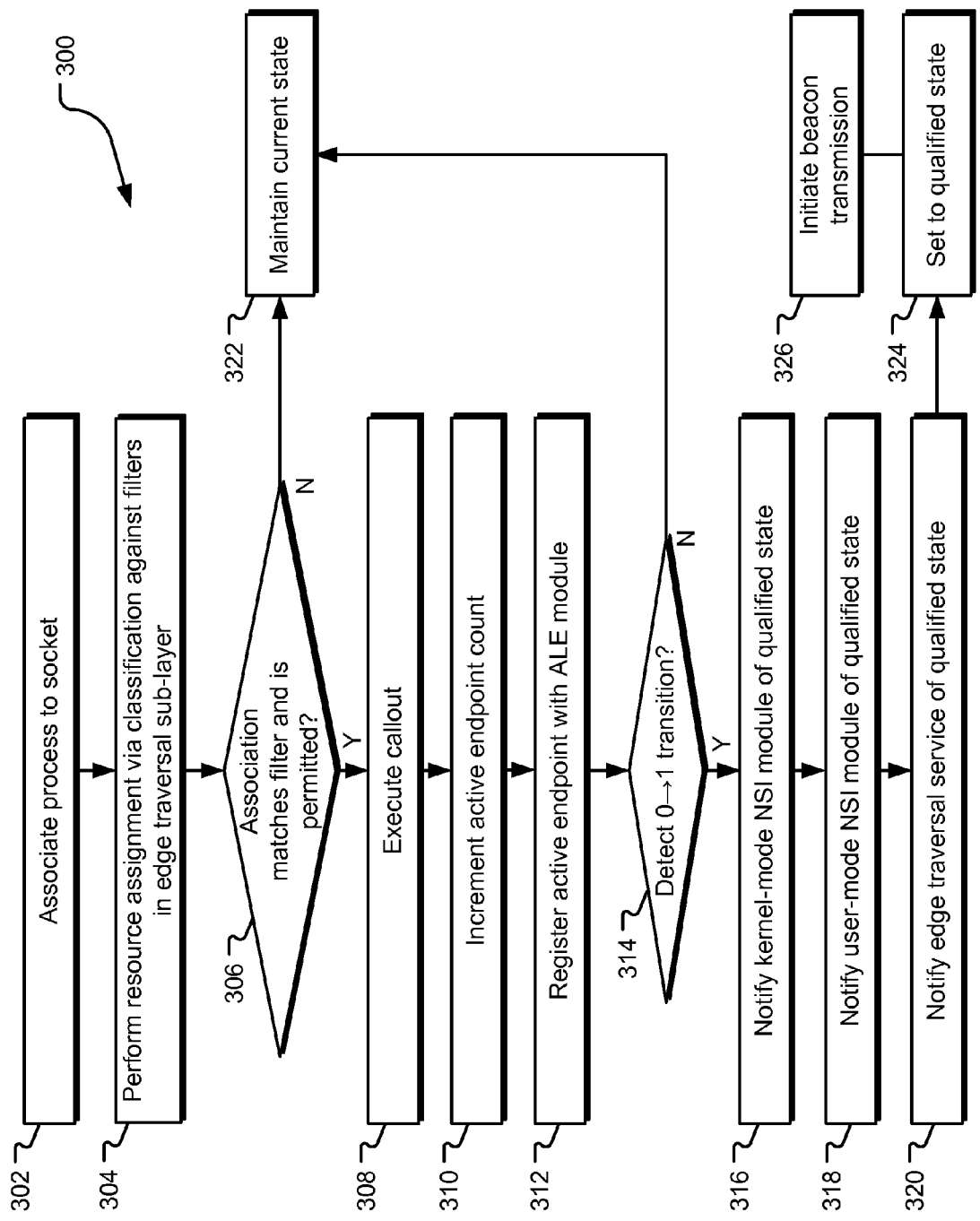
FIG. 3 illustrates example operations for adding an active edge traversal endpoint.

FIG. 3 illustrates example operations 300 for adding an active edge traversal endpoint. An association operation 302 associates a process, such as an executing application or service, to a socket. Example operations implementing an association operation may include a bind or listen command. A resource assignment operation 304 uses classification against filters in an edge traversal layer of an ALE module to execute the bind or listen command. The resource assignment is implemented using a prioritized listing of filter sub-layers. An example of the prioritized listing is illustrated below, wherein the higher weight represents a higher priority, although other implementations are contemplated:

TABLE 1

Example ALE Sub-layer Weighting

| Weight | Sub-layer |
|---|---|
| ... | ... |
| 3 | Firewall |
| 2 | Network Service Hardening |
| 1 | Edge Traversal |
| 0 | Inspection |

The resource assignment operation 304 evaluates the sub-layers from highest priority (or weight) to lowest priority (or weight). If all higher priority sub-layers permit the socket operation, the edge traversal layer may permit the socket operation, if the association operation satisfies filter in the edge traversal sub-layer. If the requesting process satisfies the filters, which coordinate to permit or block such traffic, then a decision operation 306 directs processing to a callout operation 308 to execute the callout.

In contrast, if a higher priority sub-layer (e.g., a firewall sub-layer) blocks the socket operation by the requesting process, then even if there is a filter in the edge traversal sub-layer that matches the requesting process and permits the socket operation, the resource assignment operation 304 will not satisfy the process's request and will not add a new active edge traversal endpoint because the higher priority sub-layer blocks the socket operation. In both cases, a decision operation 306 will direct processing to a maintenance operation 322, which maintains the current state (e.g., qualified or dormant) without incrementing the active edge traversal endpoint count.

The callout operation 308 instructs a framing layer to increment an active edge traversal endpoint count in an NSI provider structure. A registration operation 310 registers the new active edge traversal endpoint with the ALE module. The registration instructs the ALE module to call the framing layer when the new active edge traversal endpoint is later terminated by the process (e.g., the process terminates and closes its sockets).

A decision operation 314 detects whether the incrementing operation 310 causes the count to transition from zero to one. If not, processing proceeds to a maintenance operation 322, which maintains the current beacon transmission state (e.g., qualified or dormant). If the 0→1 transition is detected, then a notifying operation 316 notifies a kernel-mode NSI module of the new qualified beacon transmission state, another notifying operation 318 notifies a user-mode NSI module of the new qualified beacon transmission state, and yet another notifying operation 320 notifies an edge traversal service of the new qualified beacon transmission state. A state operation 324 sets the current beacon transmission state to "qualified", and a beacon operation 326 initiates transmission of the beacons from the edge traversal service.

Figure 4:
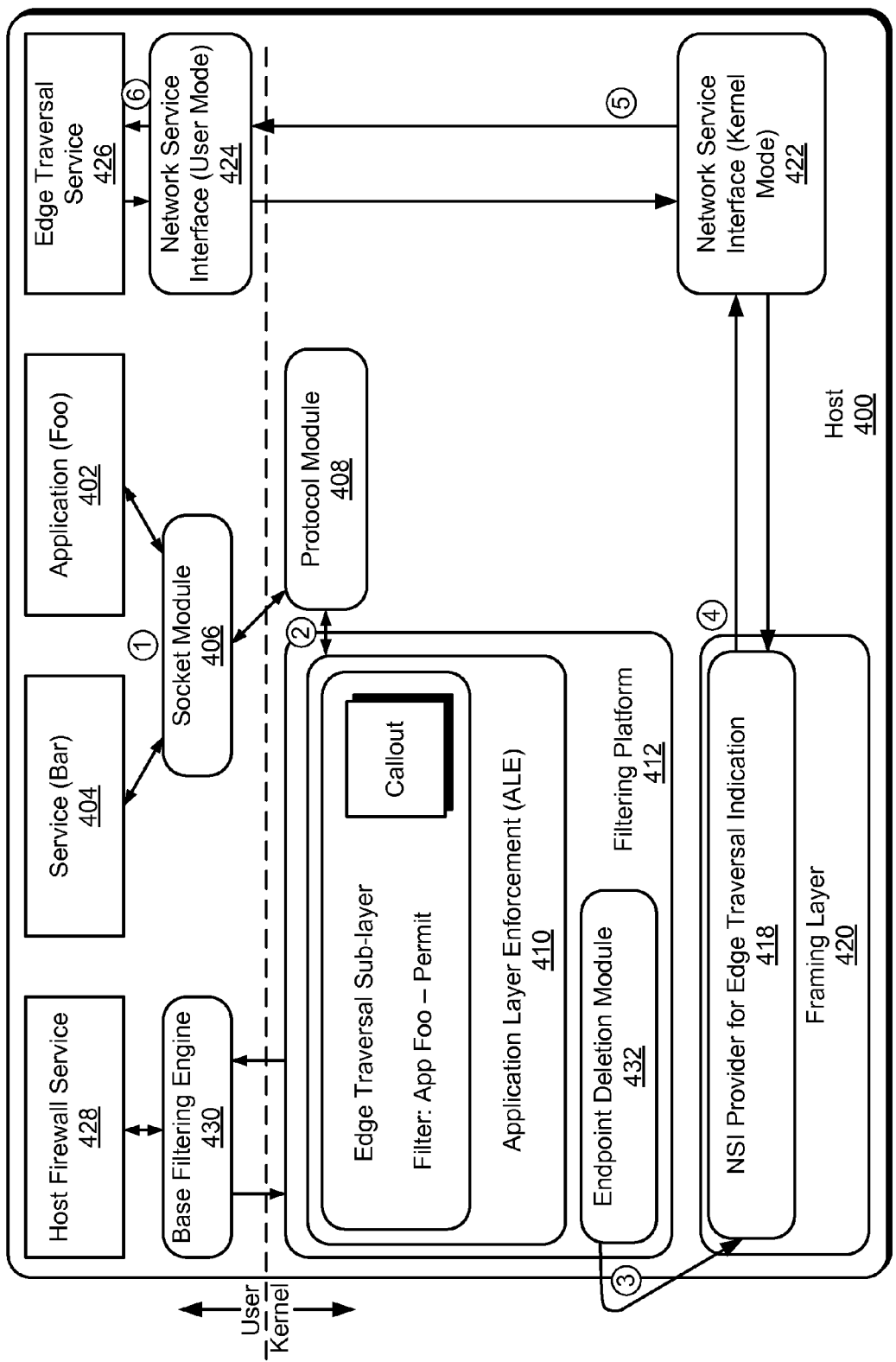
FIG. 4 illustrates an example host deleting an active edge traversal endpoint.

FIG. 4 illustrates an example host 400 deleting an active edge traversal endpoint. The host 400 executes processes (e.g., application Foo 402 and service Bar 404) capable of accepting unsolicited edge traversal traffic. To terminate acceptance of such traffic by the process or in response to a request to terminate the process, the process terminates the network communications supporting such traffic. In one implementation, the process communicates (e.g., in step 1, identified by the circle labeled "1" in FIG. 4) with a socket module 406 to effect closure of the socket through which such traffic is communicated. The socket module 406 communicates with a protocol module 408 (such as a TCP/IP stack module) to close the socket. The protocol module 408 calls (e.g., in step 2, identified by the circle labeled "2" in FIG. 4) to an application layer enforcement (ALE) module 410 in a filtering platform 412. The protocol module 408 and the ALE module 410 terminate their corresponding states representing the open socket, as part of the process of closing the socket.

In the case of deleting an active edge traversal endpoint, as described with regard to FIG. 4, an endpoint deletion module 432 within the filtering platform 412 uses the registration of the active edge traversal endpoint associated with the closed socket (see e.g., step 4 of FIG. 2) to cause the decrementing of the count of active edge traversal endpoints in an NSI provider structure 418. When the framing layer module 420 detects a 1→0 transition in the count, the framing layer module 420 notifies the kernel-mode NSI module 422 of the transition (e.g., in step 4, identified by the circle labeled "4" in FIG. 4). The kernel-mode NSI module 422 communicates a representation of the notification to the user-mode NSI module 424 (e.g., in step 5, identified by the circle labeled "5" in FIG. 4). The user-mode NSI module 424 then communicates (e.g., step 6, identified by the circle labeled "6" in FIG. 4) a representation of the notification to the edge traversal service 426. The edge traversal service 426, which would have been in a "qualified" beacon transmission state prior to this notification, interprets the communication as an instruction to transition from the "qualified" beacon transmission state to a "dormant" beacon transmission state in which the transmission of beacons through an edge device of the local network are terminated.

Also illustrated in FIG. 4 are a host firewall service 428 and a base filtering engine 430, which communicate with the filtering platform 412 to block or permit traffic destined for processes in the host 400. In the illustrated implementation, both the firewall features and the edge traversal features rely on a single filtering platform, although other implementations may be configured differently (e.g., different filtering platforms, non-filtering implementations, etc.).

Figure 5:
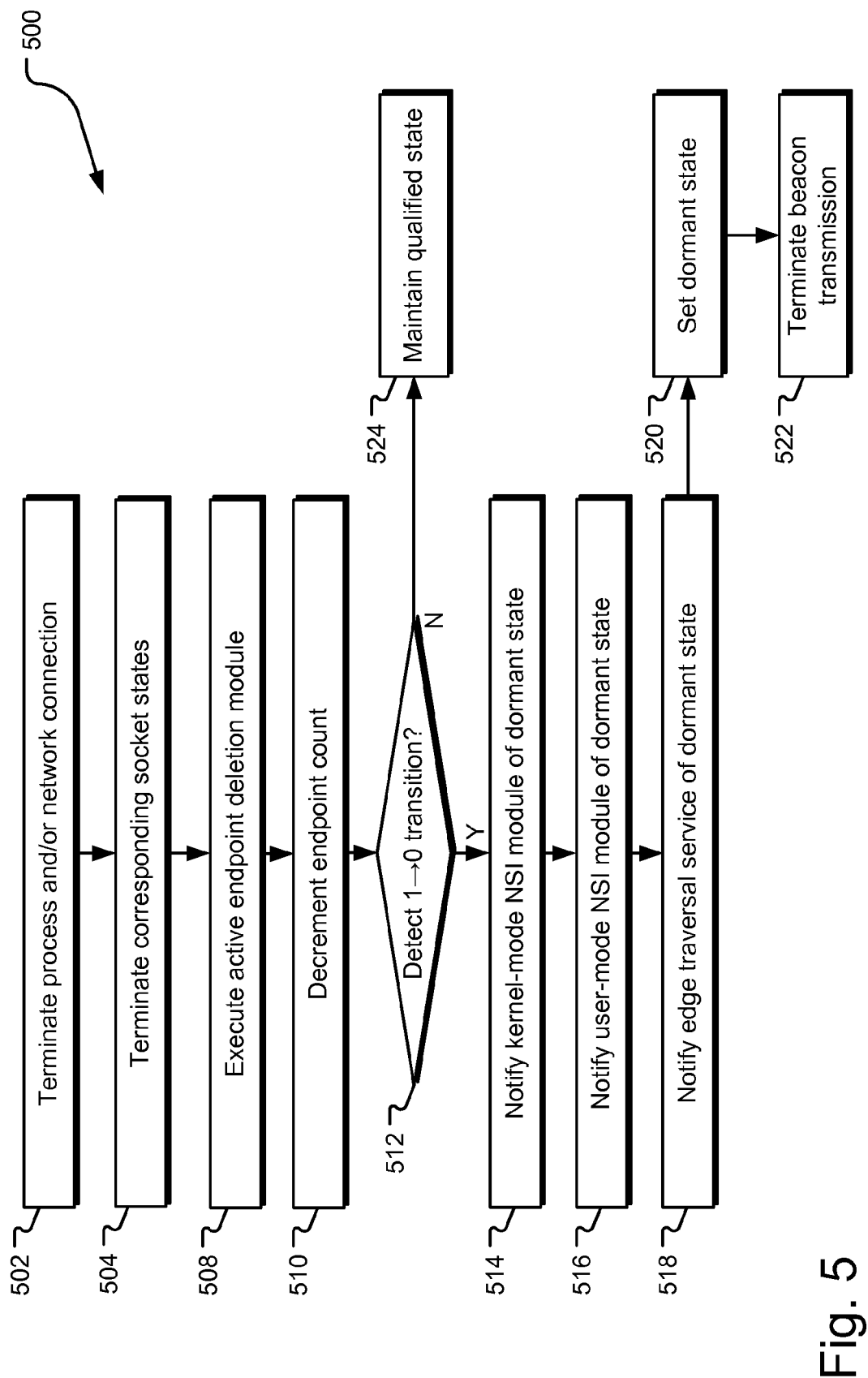
FIG. 5 illustrates example operations for deleting an active edge traversal endpoint.

FIG. 5 illustrates example operations for deleting an active edge traversal endpoint. A termination operation 502 initiates termination of a process, such as an executing application or service, and/or termination of a network connection. Example operations implementing an association operation may include a close command in reference to a TCP connection. A protocol module processes a resulting instruction to close the network connection and communicates with an application layer enforcement (ALE) module in a filtering platform. The protocol module and the ALE module coordinate termination of their corresponding states representing the open socket, as part of the process closing the socket.

A deletion operation 508 uses the registration of the active edge traversal endpoint associated with the closed socket (see e.g., step 4 of FIG. 2) to cause the decrementing of the count of active edge traversal endpoints in an NSI provider structure, in a decrementing operation 510. A decision operation 512 detects whether the decrementing operation 510 causes the count to transition from one to zero (1→0). If not, processing proceeds to a maintenance operation 524, which maintains the current beacon transmission state (e.g., dormant). If the 1→0 transition is detected, then a notifying operation 514 notifies a kernel-mode NSI module of the new dormant beacon transmission state, another notifying operation 516 notifies a user-mode NSI module of the new dormant beacon transmission state, and yet another notifying operation 518 notifies an edge traversal service of the new dormant beacon transmission state. A state operation 520 sets the current beacon transmission state to "dormant", and a beacon operation 522 terminates transmission of the beacons from the edge traversal service.

Figure 6:
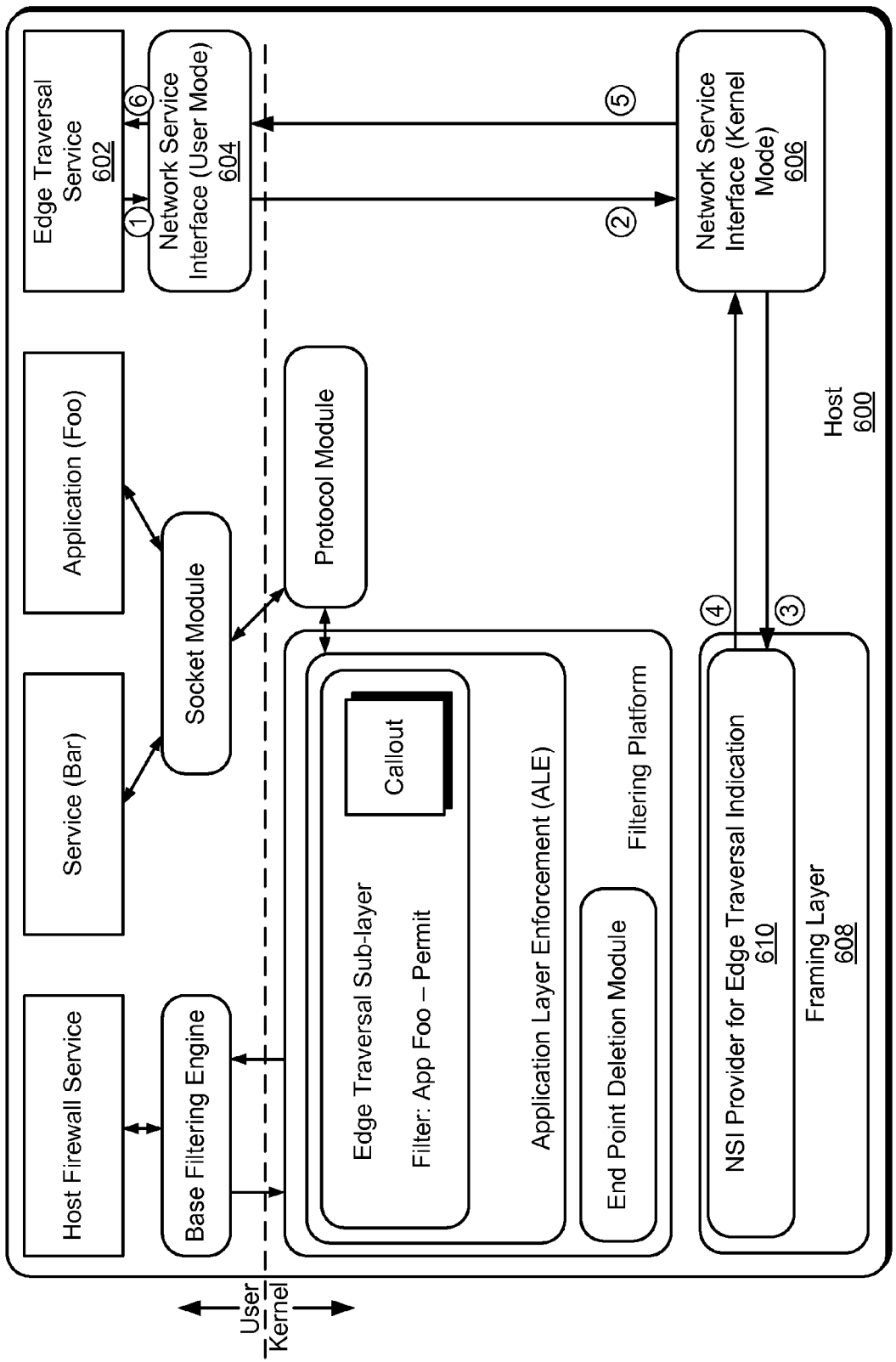
FIG. 6 illustrates an example host updating active edge traversal endpoints.

FIG. 6 illustrates an example host 600 updating active edge traversal endpoints. An edge traversal service 602 in the host may momentarily shut down and restart for a variety of reasons (e.g., system problems, programming error, etc.). As a result, if the edge traversal service 602 is restarted after one or more active edge traversal endpoints had previously been added, the edge traversal service 602 determines whether it should restart in qualified or dormant beacon transmission state.

Accordingly, the edge traversal service 602 restarts and queries (e.g., in step 1, identified by the circle labeled "1" in FIG. 6) a user-mode network service interface 604 to obtain the current beacon transmission state. The user-mode network service interface module 604 passes (e.g., in step 2, identified by the circle labeled "2" in FIG. 6) the query along to a kernel-mode network service interface module 606. The kernel-mode network service interface module 606 queries (e.g., in step 3, identified by the circle labeled "3" in FIG. 6) a framing layer 608 to determine the current count of active edge traversal endpoints maintained by a NSI provider structure 610. Based on this determination, the framing layer 608 determines whether the current count is greater then zero (>0), for which the beacon transmission state is determined to be "qualified", or equal to zero (=0), for which the beacon transmission state is determined to be "dormant" and passes (e.g., in step 4, identified by the circle labeled "4" in FIG. 6) a notification of the beacon transmission state to the kernel-mode network service interface module 606. The kernel-mode network interface module 606 passes (e.g., in step 5, identified by the circle labeled "5" in FIG. 6) a representation of the notification of the beacon transmission state to the user-mode network interface module 604, which notifies (e.g., in step 6, identified by the circle labeled "6" in FIG. 6) the edge traversal service 602 of its current beacon transmission state. The edge traversal service 602 therefore transmits or does not transmit edge traversal beacons according to this notification of the beacon transmission state.

FIG. 7 illustrates example operations 700 for updating active edge traversal endpoints. An initialization operation 702 restarts the edge traversal service. A query operation 704 (e.g., initiated by the edge traversal service or some other service) queries the user-mode NSI module for the beacon transmission state. Another query operation 706 queries the kernel-mode NSI module for the beacon transmission state. Yet another query operation 708 queries the framing layer, and specifically the NSI provider structure, beacon transmission state based on the count of active edge traversal endpoints.

If the count is greater than zero, processing proceeds through notification operations 714, 716, and 718 by communicating through the kernel-mode and user-mode NSI modules to notify the edge traversal service that it should achieve a qualified beacon transmission state. Responsive to this notification, the edge traversal service initiates beacon transmission in an initiation operation 720 and maintains the qualified beacon transmission state in a maintenance operation 722.

If the count is equal to zero, processing proceeds through notification operations 724, 726, and 728 by communicating through the kernel-mode and user-mode NSI modules to notify the edge traversal service that it should achieve a dormant beacon transmission state. Responsive to this notification, the edge traversal service does not initiate or otherwise terminates beacon transmission in an initiation operation 730 and maintains the dormant beacon transmission state in a maintenance operation 732.

The example hardware and operating environment of FIG. 8 for implementing the invention includes a computing device, such as general purpose computing device in the form of a gaming console or computer 20, a mobile telephone, a personal data assistant (PDA), a set top box, or other type of computing device. In the implementation of FIG. 8, for example, the computer 20 includes a processing unit 21, a system memory 22, and a system bus 23 that operatively couples various system components including the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, a switched fabric, point-to-point connections, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, random access memories (RAMs), read only memories (ROMs), and the like, may be used in the example operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 8. The logical connections depicted in FIG. 8 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a network adapter, a type of communications device, or any other type of communications device for establishing communications over the wide area network 52. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are example and other means of and communications devices for establishing a communications link between the computers may be used.

In an example implementation, an application layer enforcement module, a host firewall module, an edge traversal service module, a framing layer module, and other modules may be embodied by instructions stored in memory 22 and/or storage devices 29 or 31 and processed by the processing unit 21. A beacon, an NSI provider structure, and other data may be stored in memory 22 and/or storage devices 29 or 31 as persistent datastores.

The technology described herein is implemented as logical operations and/or modules in one or more systems. The logical operations may be implemented as a sequence of processor-implemented steps executing in one or more computer systems and as interconnected machine or circuit modules within one or more computer systems. Likewise, the descriptions of various component modules may be provided in terms of operations executed or effected by the modules. The resulting implementation is a matter of choice, dependent on the performance requirements of the underlying system implementing the described technology. Accordingly, the logical operations making up the embodiments of the technology described herein are referred to variously as operations, steps, objects, or modules. Furthermore, it should be understood that logical operations may be performed in any order, unless explicitly claimed otherwise or a specific order is inherently necessitated by the claim language.

The above specification, examples and data provide a complete description of the structure and use of example embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention. In particular, it should be understood that the described technology may be employed independent of a personal computer. Other embodiments are therefore contemplated. It is intended that all matter contained in the above description and shown in the accompanying drawings shall be interpreted as illustrative only of particular embodiments and not limiting. Changes in detail or structure may be made without departing from the basic elements of the invention as defined in the following claims.

Although the subject matter has been described in language specific to structural features and/or methodological arts, it is to be understood that the subject matter defined in the appended claims is not necessarily limited to the specific features or acts descried above. Rather, the specific features and acts described above are disclosed as example forms of implementing the claimed subject matter.

What is claimed is:

1. A method of managing communications of an edge traversal service of a host computer, the method comprising:
    if a count of active edge traversal endpoints associated with the edge traversal service is greater than zero, initiating transmission of edge traversal service beacons from the edge traversal service, in the host computer, to a server via a firewall to enable traffic to reach the host computer via the firewall by keeping a channel in the firewall open as a result of the transmission of the edge traversal service beacons.

2. The method of claim 1, comprising refraining from transmitting edge traversal service beacons from the edge traversal service if the count is not greater than zero.

3. The method of claim 1, comprising maintaining the count of active edge traversal endpoints associated with the edge traversal service.

4. The method of claim 1, a current beacon transmission state comprising a qualified state if the count of active edge traversal endpoints associated with the edge traversal service is greater than zero.

5. The method of claim 1, a current beacon transmission state comprising a dormant state if the count of active edge traversal endpoints associated with the edge traversal service is equal to zero.

6. The method of claim 1, the traffic enabled to reach a host process associated with the host computer.

7. The method of claim 1, comprising deleting one or more active edge traversal endpoints associated with the edge traversal service in response to receiving a request from one or more host processes associated with the one or more active edge traversal endpoints indicating a termination of acceptance of edge traversal traffic by the one or more host processes.

8. A tangible computer-readable storage medium comprising instructions that, when executed by a processor, perform a method of managing communications of an edge traversal service of a host computer, the method comprising:
   if a count of active edge traversal endpoints associated with the edge traversal service is greater than zero, initiating transmission of edge traversal service beacons from the edge traversal service, in the host computer, via a firewall to enable traffic to reach the host computer via the firewall by keeping a channel in the firewall open as a result of the transmission of the edge traversal service beacons.

9. The tangible computer-readable storage medium of claim 8, the method comprising refraining from transmitting edge traversal service beacons from the edge traversal service if the count is not greater than zero.

10. The tangible computer-readable storage medium of claim 8, the method comprising maintaining the count of active edge traversal endpoints associated with the edge traversal service.

11. The tangible computer-readable storage medium of claim 8, a current beacon transmission state comprising a qualified state if the count of active edge traversal endpoints associated with the edge traversal service is greater than zero.

12. The tangible computer-readable storage medium of claim 8, a current beacon transmission state comprising a dormant state if the count of active edge traversal endpoints associated with the edge traversal service is equal to zero.

13. The tangible computer-readable storage medium of claim 8, the method comprising deleting one or more active edge traversal endpoints associated with the edge traversal service in response to receiving a request from one or more host processes associated with the one or more active edge traversal endpoints indicating a termination of acceptance of edge traversal traffic by the one or more host processes.

14. A system comprising:
   one or more processing units; and
   a memory comprising instructions that, when executed by at least one of the one or more processing units, perform a method of managing communications of an edge traversal service of a host computer, the method comprising:
      if a count of active edge traversal endpoints associated with the edge traversal service is greater than zero, initiating transmission of edge traversal service beacons from the edge traversal service, in the host computer, to enable traffic to reach the host computer via a firewall.

15. The system of claim 14, the method comprising refraining from transmitting edge traversal service beacons from the edge traversal service if the count is not greater than zero.

16. The system of claim 14, the method comprising maintaining the count of active edge traversal endpoints associated with the edge traversal service.

17. The system of claim 14, a current beacon transmission state comprising a qualified state if the count of active edge traversal endpoints associated with the edge traversal service is greater than zero.

18. The system of claim 14, a current beacon transmission state comprising a dormant state if the count of active edge traversal endpoints associated with the edge traversal service is equal to zero.

19. The system of claim 14, the method comprising closing one or more sockets through which traffic is directed via at least one of a socket module or a protocol module.

20. The system of claim 14, the method comprising deleting one or more active edge traversal endpoints associated with the edge traversal service in response to receiving a request from one or more host processes associated with the one or more active edge traversal endpoints indicating a termination of acceptance of edge traversal traffic by the one or more host processes.

* * * * *